(12) United States Patent
Sun et al.

(10) Patent No.: US 8,027,374 B2
(45) Date of Patent: Sep. 27, 2011

(54) METHOD, SYSTEM AND APPARATUS FOR TRANSMIT DIVERSITY CONTROL

(75) Inventors: Wei Sun, Hillsborough, NJ (US); Yair Karmi, Bridgewater, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 872 days.

(21) Appl. No.: 11/645,534

(22) Filed: Dec. 27, 2006

(65) Prior Publication Data

US 2008/0160922 A1    Jul. 3, 2008

(51) Int. Cl.
*H04B 1/00* (2006.01)
*H04W 74/00* (2009.01)

(52) U.S. Cl. ............. 375/149; 455/455; 455/63.1

(58) Field of Classification Search ........... 375/149; 455/455, 63.1
See application file for complete search history.

(56) References Cited

U.S. PATENT DOCUMENTS

| | | | |
|---|---|---|---|
| 5,634,199 A | 5/1997 | Gerlach et al. | |
| 5,642,353 A | 6/1997 | Roy, III et al. | |
| 5,832,044 A | 11/1998 | Sousa et al. | |
| 5,991,330 A * | 11/1999 | Dahlman et al. | 375/149 |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 * | 5/2001 | Robbins et al. | 342/360 |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 * | 12/2002 | Kezys | 342/368 |
| 6,636,495 B1 | 10/2003 | Tangemann | |
| 6,694,155 B1 | 2/2004 | Chin et al. | |
| 6,704,370 B1 | 3/2004 | Chheda et al. | |
| 6,745,009 B2 * | 6/2004 | Raghothaman | 455/63.1 |
| 6,788,685 B1 | 9/2004 | Holtzman et al. | |
| 6,810,264 B1 | 10/2004 | Park et al. | |
| 6,816,557 B2 | 11/2004 | Kuchi et al. | |
| 6,842,632 B2 | 1/2005 | Raghothaman et al. | |
| 6,859,643 B1 | 2/2005 | Ma et al. | |
| 6,882,228 B2 | 4/2005 | Rofougaran | |
| 6,892,059 B1 | 5/2005 | Kim et al. | |

(Continued)

FOREIGN PATENT DOCUMENTS

EP    0 986 193    3/2000

(Continued)

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

(Continued)

*Primary Examiner* — Shuwang Liu
*Assistant Examiner* — Sarah Hassan
(74) *Attorney, Agent, or Firm* — Pearl Cohen Zedek Latzer, LLP

(57) ABSTRACT

A method, apparatus and system for modifying a transmit diversity signal by receiving at least one input parameter, collecting at least one interval of feedback data, computing a transmit diversity parameter, and modifying a transmit diversity signal based on the computed parameter. In some embodiments of the invention, the diversity parameter may be any one or a combination of relative phase, relative amplitude, relative power, data rate of the transmit diversity signal, or any other suitable parameter.

18 Claims, 6 Drawing Sheets

U.S. PATENT DOCUMENTS

| | | | |
|---|---|---|---|
| 6,970,438 B2 * | 11/2005 | Mate et al. | 370/329 |
| 7,200,368 B1 | 4/2007 | Hottinen et al. | |
| 7,242,954 B2 | 7/2007 | Lehtinen et al. | |
| 7,391,831 B2 | 6/2008 | Lim | |
| 7,499,709 B2 * | 3/2009 | Das et al. | 455/455 |
| 7,515,878 B2 | 4/2009 | Zhang et al. | |
| 2002/0141331 A1 * | 10/2002 | Mate et al. | 370/218 |
| 2003/0002594 A1 | 1/2003 | Harel et al. | |
| 2003/0112880 A1 | 6/2003 | Walton et al. | |
| 2003/0148770 A1 * | 8/2003 | Das et al. | 455/455 |
| 2004/0048584 A1 | 3/2004 | Vaidyanathan et al. | |
| 2004/0085239 A1 | 5/2004 | Ukena et al. | |
| 2004/0110473 A1 | 6/2004 | Rudolf et al. | |
| 2004/0198269 A1 | 10/2004 | Phillips | |
| 2004/0252797 A1 | 12/2004 | Lee | |
| 2005/0058216 A9 | 3/2005 | Nafie et al. | |
| 2005/0059355 A1 | 3/2005 | Liu | |
| 2005/0130597 A1 | 6/2005 | Li et al. | |
| 2005/0143113 A1 | 6/2005 | Lee et al. | |
| 2005/0164645 A1 | 7/2005 | Li et al. | |
| 2006/0270359 A1 | 11/2006 | Karmi et al. | |
| 2008/0049554 A1 * | 2/2008 | Crice et al. | 367/79 |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

International Search Report for International Application No. PCT/US07/23231 mailed Apr. 21, 2008.

Derryberry et al., "Transmit Diversity in 3G CDMA Systems". Wideband Wireless Access Technologies to Broadband Internet. IEEE Communications Magazine, Apr. 2002, pp. 68-75.

* cited by examiner

METHOD, SYSTEM AND APPARATUS FOR TRANSMIT DIVERSITY CONTROL

FIELD OF THE INVENTION

The present invention relates to transmit diversity in wireless systems, and in particular to transmit diversity control algorithms.

BACKGROUND OF THE INVENTION

Wireless transmission systems may use transmit diversity, whereby transmission is made using a plurality of antennas to transmit the signal to a receiver. Typically, such transmit diversity systems are intended to increase network capacity and improve coverage by reducing signal degradation that may be caused by multipath and fading effects. References describing various aspects of transmit diversity include include UK Patent Application GB 2353437A, entitled Diversity transmission means with phase adjustment depending upon a feedback signal supplied to the transmitter by the receiver; US Patent Application Publication No. 2003/0002594, entitled Communication device with Smart antenna using a quality-indication signal; US Patent Application Serial No. 2005/0130597, entitled Adjusting a signal at a diversity system; US Patent Application Serial No. 2005/0164645, entitled Communicating signals according to a quality indicator using multiple antenna elements; and US Patent Application Serial No. 2006/0270359, entitled Determining a phase adjustment in accordance with power trends. There is a need for an improved algorithm for control of transmit diversity.

SUMMARY OF EMBODIMENTS OF THE INVENTION

Embodiments of the present invention include a method, apparatus and system for modifying a transmit diversity signal by receiving at least one input parameter, collecting at least one interval of feedback data, computing a transmit diversity parameter, and modifying a transmit diversity signal based on the computed parameter. In some embodiments of the invention, the diversity parameter may be any one or a combination of relative phase, relative amplitude, relative power, data rate of the transmit diversity signal, or any other suitable parameter.

In some embodiments of the invention, a delay time may be used to allow for system delays. Furthermore, in some embodiments of the invention, parameters may be computed based on alternating sets of collected data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
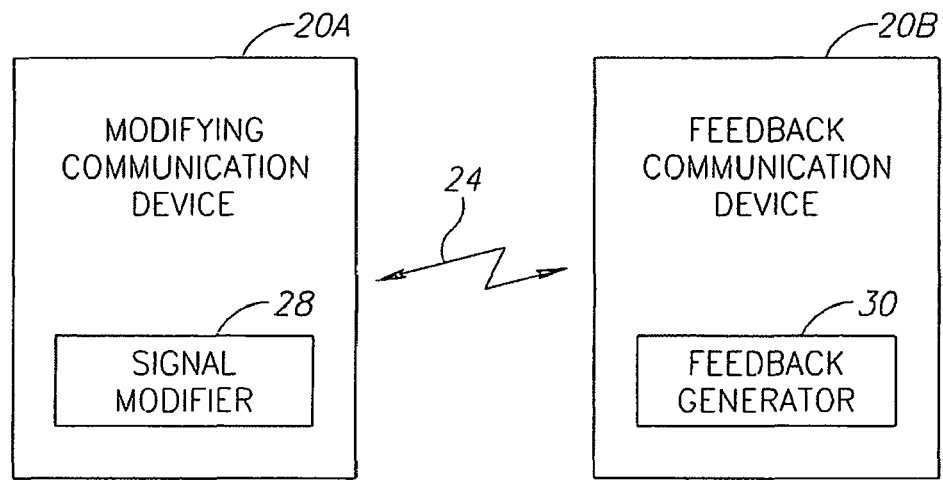
FIG. 1 depicts a block diagram of a communication network according to an embodiment of the present invention that includes one or more transmitting communication devices and one or more receiving communication devices that communicate via a wireless link.

It will be appreciated that for simplicity and clarity of illustrations, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF ILLUSTRATED EMBODIMENTS OF THE PRESENT INVENTION

Embodiments of the present invention may allow for transmit diversity control by using a system that uses windows to enhance the system throughout, for example, by requiring less repetitions or supporting higher data rate and larger, more efficient data packets. Embodiments of the present invention may allow for a more stable system by offering an improved control algorithm. Embodiments of the present invention may allow for improvement of wireless communication system capacity by offering optimized performance. Embodiments of the present invention may allow for improvement of transmission efficiency by fading mitigation and beamforming.

Embodiments of the invention may provide for better performance, measured, for example, in terms of any one, some or all of the power the unit is required to transmit for the receiver to receive acceptable signal quality, the number of errors in the transmission, higher throughput, improved coverage, and stability resulting from possibly fewer changes in the diversity control parameters.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of die present invention and its advantages are best understood by referring to FIGS. 1 through 6, like numerals being used for like and corresponding parts of the various drawings.

FIG. 1 is a block diagram illustrating a communication network 10 according to an embodiment of the present invention that includes a modifying communication device 20a that adjusts a nominal value of a transmit diversity parameter. According to the embodiment, modifying communication device 20a may compute a diversity parameter from a window algorithm that is used to control transmit diversity for a signal transmitted from communication device 20a to receiving communication device 20b. Modifying communication device 20a may adjust a nominal value of a transmit diversity parameter based on the decision computed from the window algorithm.

According to the illustrated embodiment, network 10 may operate to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 10 may utilize communication protocols and technologies to provide the communication sessions. Examples of communication protocols and technologies include those set by the Institute of Electrical and Electronics Engineers, Inc. (IEEE) 802.xx standards. International Telecommunications Union (ITU-T) standards, European Telecommunications Standards Institute (ETSI) standards, Internet Engineering Task Force (IETF) standards, or other standards.

Devices of network 10 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

Network 10 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

A component of network 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication network 10 may include one or more modifying communication devices 20a and one or more feedback communication devices 20b that communicate via a wireless link 24. Either or both of communication devices 20a or 20b may be any device operable to communicate information via signals with one or more other communication devices. For example, communication device 20a or 20b may comprise a subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

Either or both of communication devices 20a or 20b may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between conmmunication devices 20a and 20b such as wireless link 24 may be a radio frequency link that is cellular in network organization. Wireless link 24 may be used to communicate a signal between communication devices 20a and 20b.

As described more fully below, according to embodiments of the present invention, modifying communication device 20a may include a signal modifier 28 that modifies one or more signals. Signal modifier 28 may then modify the transmit signal in accordance with a window algorithm corresponding to the computation of diversity parameters.

According to one embodiment, modifying a signal may refer to modifying a signal feature. A transmission signal feature, or in some embodiments of the invention, a transmit diversity parameter, may refer without limitation to any feature of the transmission, for example, relative phase, relative amplitude, relative power, data rate, or any combination of the preceding. Relative phase may refer to the phase difference between the phase of a signal transmitted by a first transmit antenna element and the phase of a signal transmitted by a second transmit antenna element. Relative power may refer to the ratio between the power of a signal transmitted by a first transmit antenna element and the power of a signal transmitted by a second transmit antenna element, which ratio may be defined on a linear or logarithmic scale. Relative amplitude may refer to the ratio between the amplitude of a signal transmitted by a first transmit antenna element and the amplitude of a signal transmitted by a second transmit antenna element. Data rate may refer to an amount of data transmitted in a given time. According to one embodiment, modifying a signal may be described as adjusting a nominal value of a transmit diversity parameter. As described more fully herein, according to an embodiment of the invention, adjustment of a transmit diversity parameter may comprise computing diversity parameters from a window algorithm and then using said diversity parameters in a transmit diversity system.

A modifying communication device 20a may calculate transmit diversity parameters for use in transmitting across wireless link 24. Modifying communications device 20a may modify transmit diversity parameters for transmission to receiving communication device 20b using values derived from a window algorithm.

According to one embodiment of the invention, modifying communication device 20a may include a signal modifier 28 and feedback communication device 20b may include a feedback generator 30. Feedback generator 30 may generate signals to control transmission parameters to modifying communication device 20*a*. The signals may be generated by any suitable manner, for example, based on signals from the modifying communication device 20*a*, actual environmental conditions at the modifying communication device 20*a*, one or more performance parameters measured at modifying communication device 20*a*, or other indications. Signal modifier 28 may modify a pre-transmission signal in accordance with one or more transmit diversity parameters computed from signals feedback generator 30.

In some embodiments information may be transmitted over wireless link 24 that may be based on a predefined time interval. The predefined time interval may, for example, be defined by a CDMA or a W-CDMA system.

Alterations or permutations such as modifications, additions, or omissions may be made to communication network 10 without departing from the scope of the invention. Additionally, operations of communication network 10 may be performed using any suitable logic comprising software, hardware, other logic, or any suitable combination of the preceding.

Figure 2:
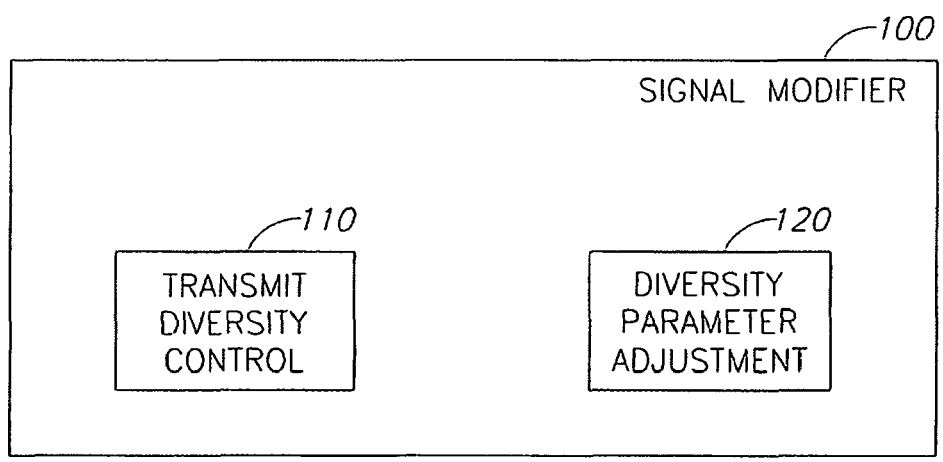
FIG. 2 depicts a block diagram of a diversity signal modifier according to an embodiment of the present invention.

FIG. 2 is a block diagram of signal modifier module 100 according to an embodiment of the invention that includes a transmit diversity control module 110 that may be used in network 10. In some embodiments, signal modifier module 100 may comprise at least part of signal modifier 28 depicted in FIG. 1, however, it will be noted that other configurations for the signal modifier 29 are possible and within the scope of the invention. Signal modifier module 100 may include a transmit diversity control module 110 and a diversity parameter adjustment module 120.

In operation, inputs may be received by transmit diversity control module 110, which may compute diversity parameters. In an embodiment of the invention, transmit diversity control module 110 may compute the virtual diversity parameters from the inputs and/or from diversity parameters that may be fed back from diversity parameter adjustment 120. Parameters generated by transmit diversity control module 110 may be received by diversity parameter adjustment 120, which in turn may convert computed parameters into parameter adjustments. These adjustments may be used for implementing transmit diversity, for example, using signal modifier 28 in FIG. 1. Computations by transmit diversity control module 110 and/or adjustments by diversity parameter adjustment 120 may consider system delay effects, which, for example, may be the time from a diversity parameter adjustment to the time when feedback information is available to signal modifier 100.

Alterations or permutations such as modifications, additions, or omissions may be made to signal modifier module 100 without departing from the scope of the invention. For example, signal modifier module 100 may have more, fewer, or other sub-modules. Additionally, operations of signal modifier module 100 may be performed using any suitable logic comprising software, hardware, or any suitable combination of the preceding.

Figure 3:
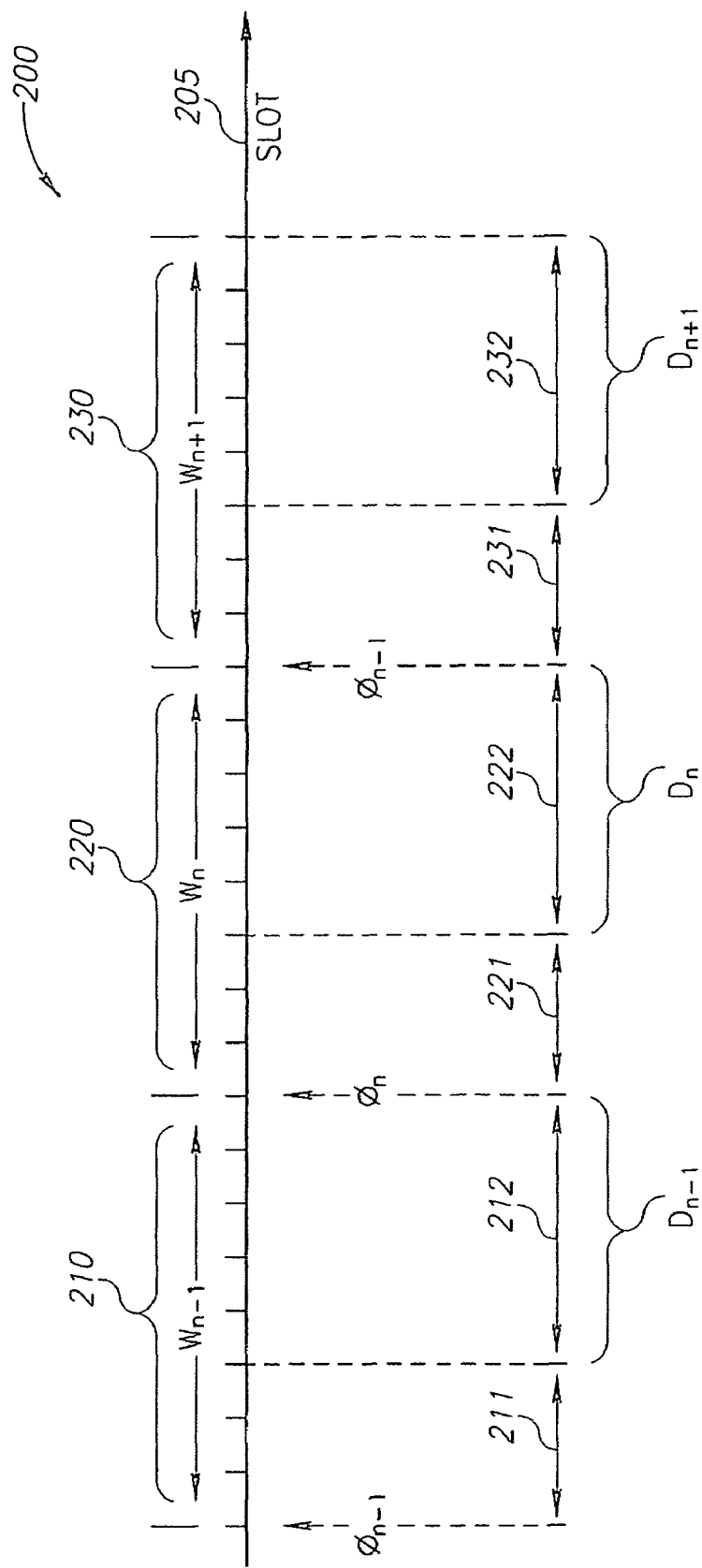
FIG. 3 is a schematic depiction of a set of windows in accordance with an embodiment of the present invention.

FIG. 3 is a graph 200 of an embodiment of the invention plotting slots on axis 205 illustrating groups of slots that may be formed into windows. The slots may be time slots, and each slot may contain data to be transmitted. In FIG. 3, each of window n−1 210, window n 220, and window n+1 230 depicts a group of slots associated with a transmit diversity parameter value $\phi_{n-1}$, $\phi_n$, and $\phi_{n+1}$ respectively, and may represent a grouping in time that may be in sequence. In some embodiments, the sequence may be defined following the establishment of a connection between a transmit device and a receive device. At the start of a window, a value of a diversity parameter, for example a relative phase difference $\phi$, may be applied to signals transmitted from a transmitter.

In FIG. 3, a first window may be window n−1 210 and a first diversity parameter value may be relative phase difference $\phi_{n-1}$; a second window may be window n 220 and a second diversity parameter value may be relative phase difference $\phi_n$; and a third window may be window n+1 230 and a third diversity parameter value may be relative phase difference $\phi_{n+1}$. During each of windows 210, 220 and 230, there may be an initial delay period 211, 221 and 231, respectively. In each window, after a suitable delay, data may be collected for periods of time $D_{n-1}$ 212, $D_n$ 222, and $D_{n+1}$ 232. The data collected may be associated with system performance from the diversity parameter in the associated window, for example, relative phase difference $\phi_{n-1}$, in window n−1 210, etc.

In embodiments of the invention, delay periods 211, 221 and 231 may be any suitable delay, for example, based on the time the system may use to respond to a change of transmitted signals that may occur from the application of a relative phase difference to transmit antennas, where the application of a relative phase difference may occur at a start of a window. Accordingly in an embodiment of the invention, during the delay period, the algorithm may be idle and may not be actively collecting measurements at a transmitter, for example, based on feedback from a receiver.

In an embodiment of the inventions, using data collected during the data collection period, a modification to the value of a transmit diversity parameter may be calculated and implemented. For example, based on data collected at period $D_{n-1}$ 212, relative phase difference $\phi_n$ may be generated. In some embodiments, if there is insufficient time between the end of data collection period $D_{n-1}$ 212 and implementation of the transmit diversity parameter, the data may be used to calculate a subsequent transmit diversity parameter, for example, $\phi_{n+1}$ or the transmit diversity parameter to be applied in yet another subsequent window.

Figure 4:
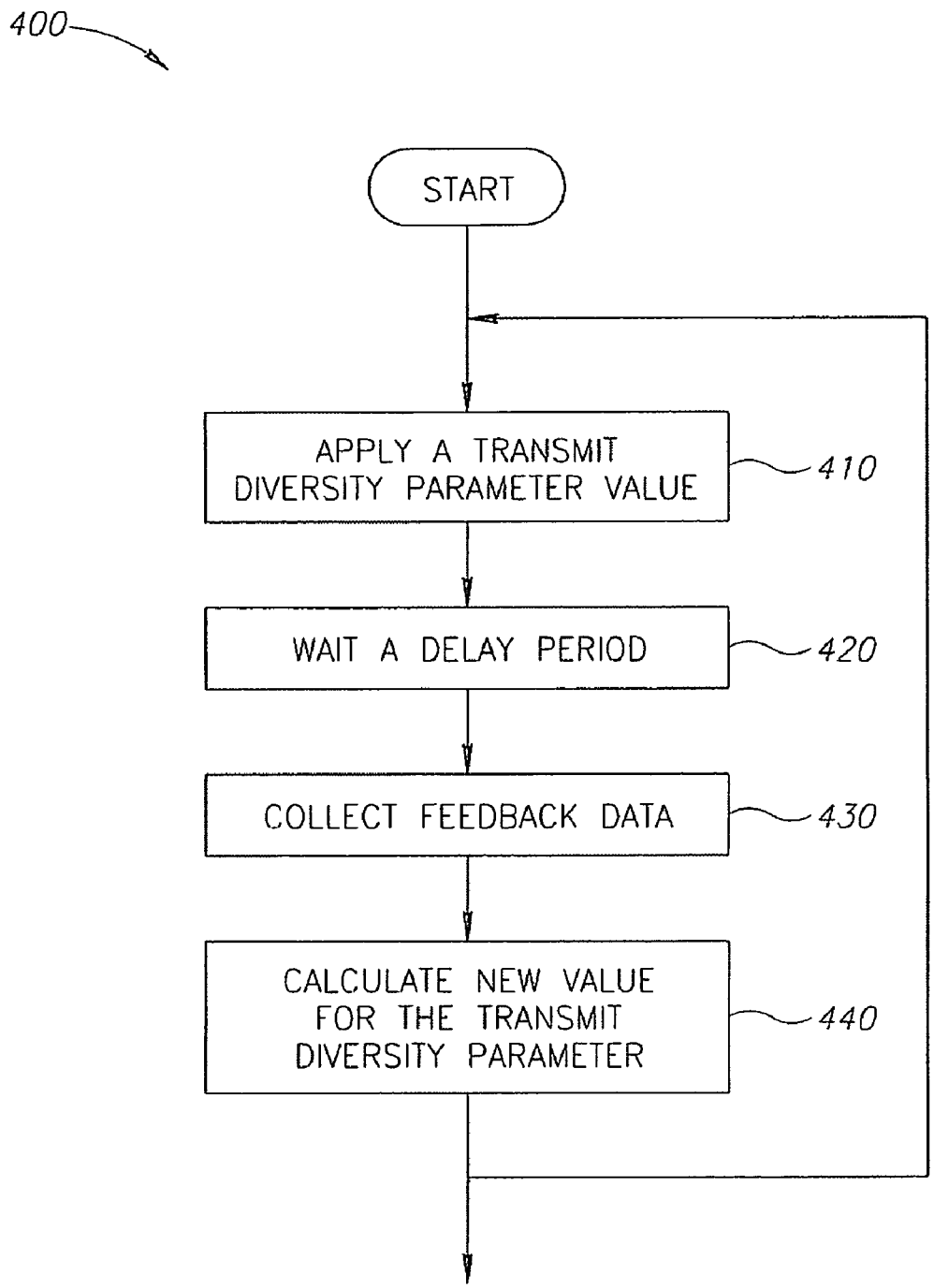
FIG. 4 is a flowchart illustrating a method in accordance with an embodiment of the present invention.

FIG. 4 is a flowchart 400 depicting a method in accordance with the present invention. At block 410, the system applies a value of a transmit diversity parameter, for example. $\phi_{n-1}$. At block 420, the system may introduce a time delay period, for example, $Del_{n-1}$. After waiting a delay period, during which data is not collected, the system collects feedback data at block 430 for a period of time $D_{n-1}$. $D_{n-1}$ may be the difference between the time duration of a window and $Del_{n-1}$. Using this data, at block 440, a new value for the transmit diversity parameter $\phi_n$ may be calculated. The method may then repeat starting from step 410, applying the new value $\phi_n$, etc. In other embodiments, the method may repeat after two or more consecutive iterations, for example, block 440 calculates a new value $\phi_{n+1}$, for the transmit diversity parameter, as described with reference to FIG. 3.

Figure 5:
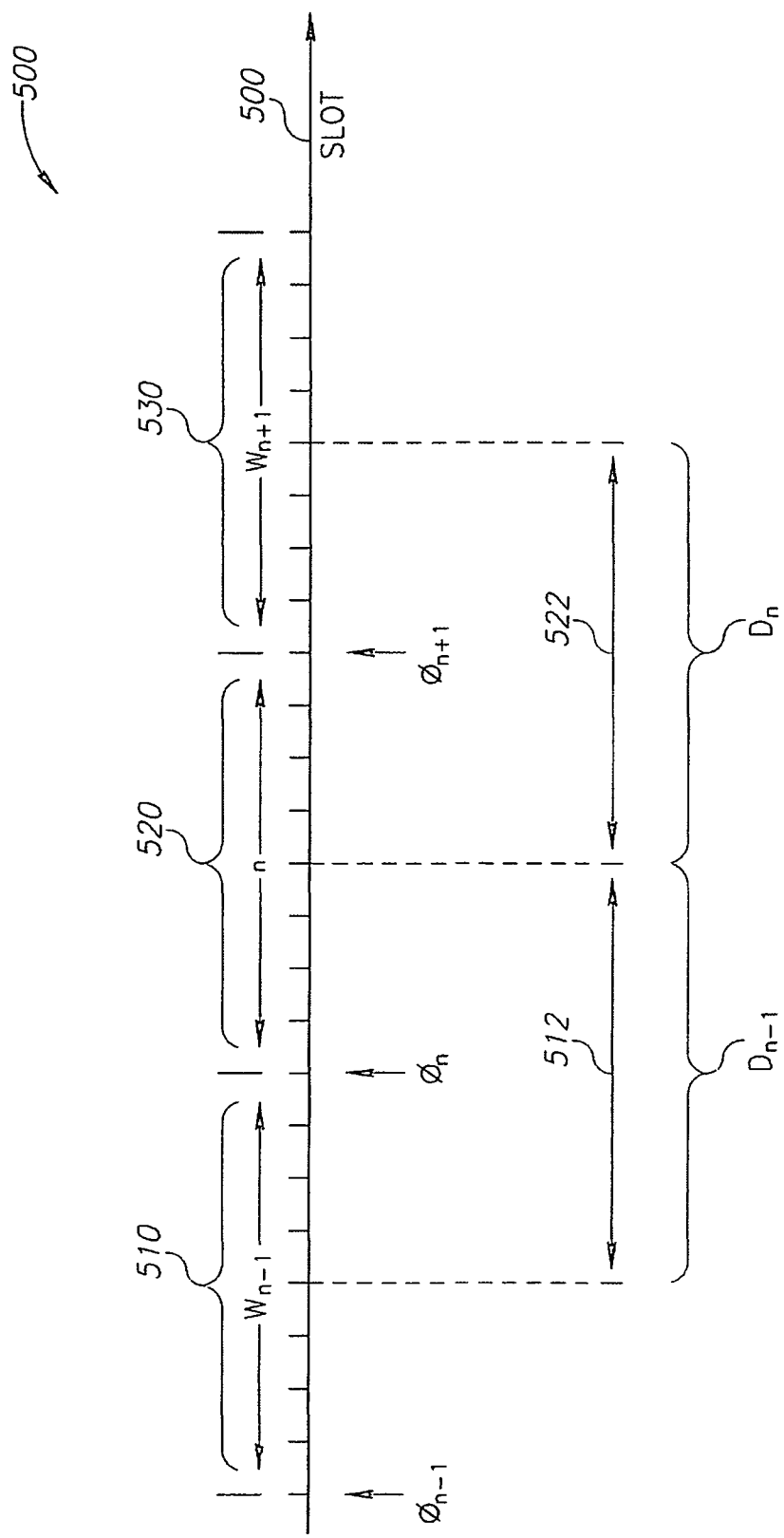
FIG. 5 is a schematic depiction of a set of windows according to an embodiment of the present invention.

FIG. 5 is a graph 500 plotting slots on axis 505, illustrating groups of slots that may be formed into windows in accordance with an embodiment of the invention. The slots may be time slots, and each slot may contain data. In FIG. 5, each of window n−1 510, window n 520, and window n+1 530 depict a group of slots and may represent a grouping in time that may be in sequence. In some embodiments the sequence may be defined following the establishment of a connection between a transmit device and a receive device. At the start of a window, a diversity parameter, for example a relative phase difference $\phi$, may be applied to signals transmitted from a transmitter. The diversity parameter may be, for example, a relative phase difference. A value for the relative phase difference applied at the start of a first window n−1 510 may be $\phi_{n-1}$; a value for the relative phase difference applied at the start of a second window n 520 may be $\phi_n$; a value for the relative phase difference applied at the start of a third window n+1 530 may be $\phi_{n+1}$, etc.

During a period of time $D_{n-1}$ 512, data may be collected, for example, data associated with system performance from relative phase difference $\phi_{n-1}$. In an embodiment of the invention, data collection time $D_{n-1}$ 512 may begin during window n−1 510, and may continue or overlap into window n 520. Subsequently, during a period of time $D_n$ 522, data may be collected, for example, data associated with system performance from relative phase difference $\phi_n$. In an embodiment of the invention, data collection time $D_n$ 522 may begin during window n 520, and may continue or overlap into window n+1 530. In some embodiments of the invention, a data collection time may have the same duration as an associated window duration. The portion of data collection time in the first window and the portion of the data collection time in the second window may be any suitable portions of time, for example, based on the time the system may use to respond to a change of transmitted signals that may occur from the application of a relative phase difference to transmit antennas, where the application of a relative phase difference may occur at a start of a window.

Following a window n 520, during which time transmit diversity parameter value, for example, relative phase difference $\phi_n$ was implemented, the algorithm may determine a new value for the diversity parameter, for example, a relative phase difference $\phi_{n+1}$ to be implemented. Phase difference $\phi_{n+1}$ may be based on the previous phase difference $\phi_n$ and a result of a computation based upon data collected during a data collection time, for example, data collection time $D_{n-1}$ 512, and/or data collection time $D_n$ 522, or a combination of both. In some embodiments only part of data collected during data collection time $D_n$ 522 may be considered for purposes of calculating $\phi_{+1}$, for example, the portion of data collected during data collection time $D_n$ that is received during window n 520. The algorithm may derive a signal quality indicator from the data collected during the relevant data collection period(s). A plurality of signal quality indicators may be used to compute a diversity parameter adjustment. An adjustment may consist of, for example, a phase adjustment $\Delta\phi$, a direction adjustment $\Delta d$, or both. An adjustment of, for example a new relative phase difference $\phi_{n+1}$ 235 may be derived using $$\Phi_{n+1} = \Phi_n + \Delta d \cdot \Delta \Phi \quad (1)$$

where $\phi_{n+1}$ may be a new relative phase difference, $\phi_n$ may be a previous relative phase difference, $\Delta\phi$ may be a phase adjustment, and $\Delta d$ may be a direction adjustment.

Figure 6:
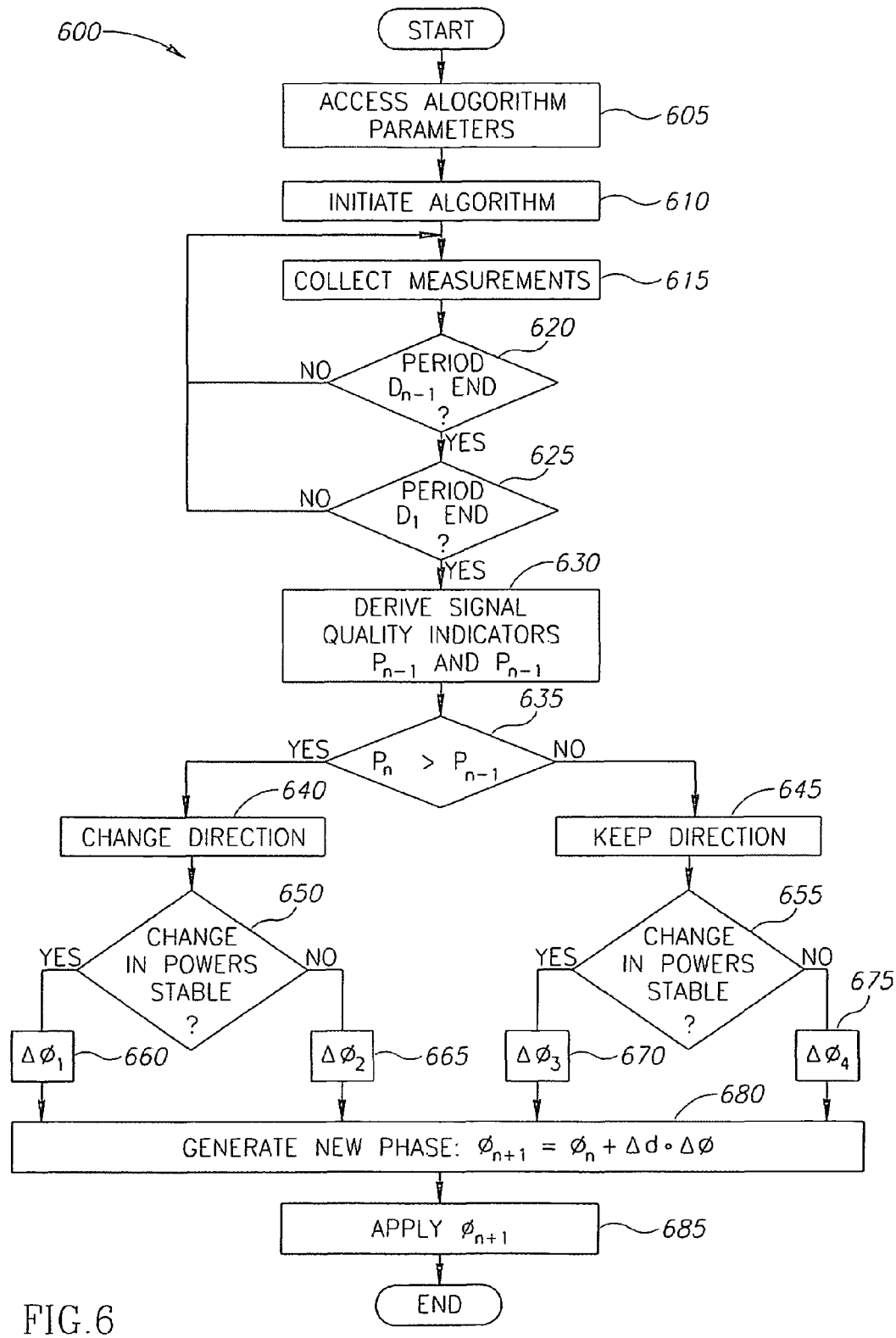
FIG. 6 is a flowchart illustrating a method in accordance with an embodiment of the present invention.

FIG. 6 is a flowchart 600 illustrating a method in accordance with embodiments of the invention for computing new diversity parameters from previous diversity parameters and collected data that may be used with any suitable communication device, such as communication device 20a. At block 605, algorithm parameters may be accessed, for example, from a memory. The algorithm parameters may include definitions of sizes of data collecting periods, parameters describing signal fluctuations that may occur during data collecting periods, parameters describing the method of deriving one or more signal quality indicators, parameters describing sizes of phase changes, or any combination thereof. At block 610, these accessed parameters may be used to initiate the algorithm of the present invention.

At block 615, measurements may be collected during a data collection period $D_{n-1}$. Measurements may include feedback information, which in turn may include an indication of the quality of a received signal, an indication of the quality of the channel between a transmitter and a receiver, a desired data rate from a transmitter, a desired adjustment of transmit signal power, or any combination thereof. Feedback information may be received from a receiver and may include signal power level information for signals transmitted from a transmitter.

At block 620 it may be decided whether the period of time for data collection time $D_{n-1}$ is sufficient or has terminated. At block 625, it may be decided whether the period of time for data collection time $D_n$ is completed. At block 630, signal quality indicators $P_{n-1}$ and $P_n$ may be derived, corresponding to data collection time periods $D_{n-1}$ and $D_n$, respectively. A signal quality indicator may be a quantity that may describe the quality of one or more signals, for example, associated with a phase difference. The indicator may be, for example, the average power of a plurality of signals that may have been accumulated during a data collection period. A signal quality indicator may be used to evaluate one or more effects of one or more phase changes on a system. An indicator may be used to implement an adjustment for a next window.

At block 635, a comparison may be made between relative values of signal quality indicators $P_{n-1}$ and $P_n$ and a decision may be made to change the value of a transmit diversity parameter. In one embodiment of the invention, a signal quality indicator may be average signal power, and the average signal power $P_n$ of time period $D_n$ may be, for example, higher than the average signal power $P_{n-1}$ of time period $D_{n-1}$. This condition may indicate a phase $\phi_n$ applied at the beginning of a window n may cause an increase in power of signals with respect to the power in signals that may be associated with phase $\phi_{n-1}$ applied at the start of a window n−1. This condition may indicate that an increment in a transmitted signal power may result in a reduction of transmit diversity performance, further indicating that adjustments of, for example, phase and/or direction, that may have been applied at the beginning of window n may not meet certain criteria for an improvement of diversity performance, and thus may require further modification. An example of a modification may be a direction of a phase adjustment that may occur at block 640. The adjustment may apply to relative phase, relative power, or both.

The average signal power $P_n$ of time period $D_n$ may be, for example, lower than the average signal power $P_n$ of time period $D_{n-1}$. This may indicate an improvement in transmit diversity performance from parameters applied at the beginning of window n, and the algorithm may maintain the direction of the parameters applied at the beginning of window n at block 645. At block 650 or at block 655 a size of, for example, a phase adjustment may be determined by deciding if, for example, signal power levels are stable. This decision may be based on information collected during time period $D_n$, or both time period $D_{n-1}$ and time period $D_n$. The decision criteria may consist of, for example, a predefined measure of a signal fluctuation during time period $D_n$, or, for example, a comparison between a signal quality indicator and a set of predefined thresholds.

At bock 660 and at block 665 a phase adjustment size is generated for each condition of the case where, for example, average signal power $P_n$ may be determined to be greater than average signal power $P_{n-1}$. At bock 670 and at block 675 a phase adjustment size may be generated for each condition of the case where, for example, average signal power $P_n$ may be determined to be less than average signal power $P_{n-1}$. In some embodiments more than two phase adjustments may be generated for each condition, and additional detail or resolution of phase adjustment may be possible.

At block 680, a new relative phase difference may be computed, for example, based on the relationship of Equation (1), explained above. At block 685 a new relative phase $\phi_{n+1}$ may be applied to a plurality of transmit antennas, and may modify, signals transmitted from transmit antennas, and may remain in effect for the duration of window n+1.

Figure 7:
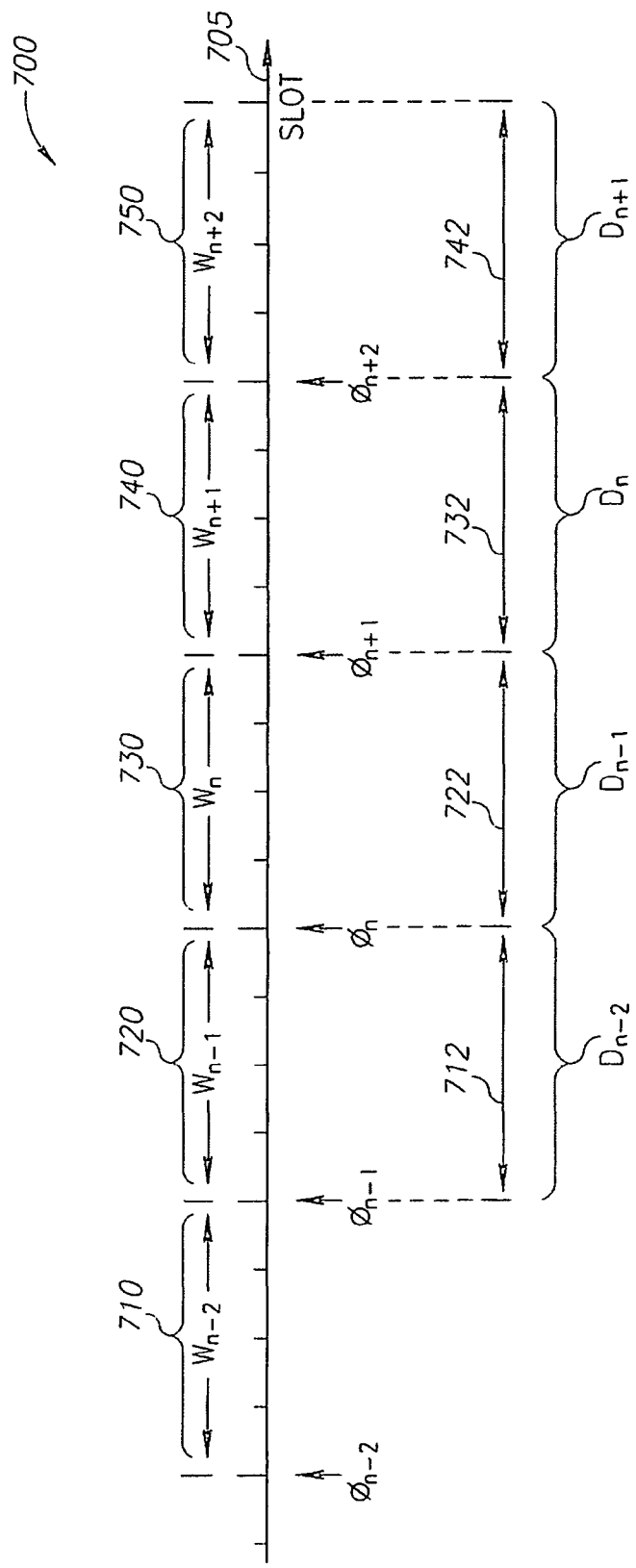
FIG. 7 is a schematic depiction of a set of windows according to an embodiment of the present invention.

FIG. 7 is a graph 700 of an embodiment of the present invention plotting slots on axis 705 illustrating groups of slots that may be formed into windows. The slots may be time slots, and each slot may contain data. In FIG. 7, each of window n−2 710, window n−1 720, window n 730, window n+1 740, and window n+2 750 depicts a group of slots and may represent a grouping in time that may be in sequence. In some embodiments the sequence may be defined following the establishment of a connection between a transmit device and a receive device. At the start of a window, a value of a diversity parameter, for example a relative phase difference $\phi$, may be applied to signals transmitted from a transmitter.

In FIG. 7, a first window may be window n−2 710 and a first diversity parameter value may be relative phase difference $\phi_{n-2}$; a second window may be window n−1 720 and a second diversity parameter value may be relative phase difference $\phi_{n-1}$; and a third window may be window n 730 and a third diversity parameter value may be relative phase difference $\phi_n$, etc. For each window, data may be collected for periods of time $D_{n-2}$ 712, $D_{n-1}$ 722, $D_n$ 732, and $D_{n+1}$ 742. The data collected may be associated with system performance from the diversity parameter in the associated window, for example, data collection period $D_{n-1}$ 722 may collect data pertaining to system performance during application of relative phase difference $\phi_{-1}$ in window n−1 720.

In the embodiment of the invention depicted in FIG. 7, each window may include a single data collection period. Accordingly, during a first window period, e.g., window n−2, relative phase difference $\phi_{n-2}$ may be applied. During the subsequent window period, e.g., window n−1, data may be collected pertaining to system performance based on relative phase difference $\phi_n$-2. During yet another subsequent window period, e.g., window n, relative phase difference $\phi_n$ may be applied.

It will thus be recognized that there may be alternating phases of implementation and application. Data may be collected in even-numbered designated windows and may be compared with data that may be collected in other even-numbered designated windows to generate, for example, a relative phase difference. Similarly, data may be collected in odd-numbered designated windows and may be compared with data that may be collected in other odd-numbered designated windows to generate, for example, a relative phase difference. A new relative phase difference may be generated by this embodiment of the modified window algorithm following each data collecting time. Further, a single relative phase difference may be applied during single data collection time.

It will be recognized that while the example above is based on relative phase, any transmit diversity parameter may be used, for example, relative amplitude, relative power, frequency of change, timing of application of the transmit diversity controls, or other parameters.

Embodiments of the invention may apply to any transmit diversity control method. It will be understood that the methods discussed herein may be integrated with any transmit diversity control algorithm. It will further be understood that the present invention may be implemented as a stand-alone processing module, or may be integrated into a transmit diversity control processor, algorithm, or signal path circuitry.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of modifying a transmit diversity signal comprising:
   transmitting during a first transmission period a transmit diversity signal using a first transmit diversity parameter value, wherein said first transmission period comprises at least a full slot period;
   transmitting during a second transmission period immediately subsequent to said first transmission period, a transmit diversity signal using a second transmit diversity parameter value;
   during a first data collection period, receiving from a receiver a first plurality of quality indication signals pertaining to system performance using said first transmit diversity parameter value, wherein said first data collection period begins after the start of the first transmission period;
   during a second data collection period, receiving from a receiver a second plurality of quality indication signals pertaining to system performance using said second transmit diversity parameter value, wherein said second data collection period begins after the start of the second transmission period; and
   calculating a subsequent transmit diversity parameter value based on said first plurality of quality indication signals.

2. The method of claim 1, wherein said first data collection period ends substantially contemporaneously with the end of said first transmission period.

3. The method of claim 1, wherein said first data collection period ends after the end of said first transmission period.

4. The method of claim 1, wherein said first data collection period ends after the end of said first transmission period, and wherein said second data collection period begins substantially immediately after the end of said first data collection period.

5. The method of claim 1, wherein said second transmit diversity parameter is the transmit diversity parameter value calculated based on said first plurality of quality indication signals.

6. The method of claim 1, further comprising:
   transmitting during a third transmission period subsequent to said second transmission period, a transmit diversity signal using a third transmit diversity parameter value, wherein said third transmit diversity parameter is the transmit diversity parameter value calculated based on said first plurality of quality indication signals.

7. An apparatus for modifying a transmit diversity signal comprising:
   a transmitter to transmit during a first transmission period a transmit diversity signal using a first transmit diversity parameter value, wherein said first transmission period comprises at least a full slot period;
   a receiver to receive during a first data collection period a first plurality of quality indication signals pertaining to system performance using said first transmit diversity parameter value, wherein said first data collection period begins after the start of the first transmission period; and
   a processor to calculate a subsequent transmit diversity parameter value based on said first plurality of quality indication signals,
   wherein said transmitter is further to transmit during a second transmission period immediately subsequent to said first transmission period, a transmit diversity signal using a second transmit diversity parameter value, and wherein during a second data collection period said receiver is to receive a second plurality of quality indication signals pertaining to system performance using said second transmit diversity parameter value, wherein said second data collection period begins after the start of the second transmission period.

8. The apparatus of claim 7, wherein said first data collection period ends substantially contemporaneously with the end of said first transmission period.

9. The apparatus of claim 7, wherein said first data collection period ends after the end of said first transmission period.

10. The apparatus of claim 7, wherein said first data collection period ends after the end of said first transmission period, and wherein said second data collection period begins substantially immediately after the end of said first data collection period.

11. The apparatus of claim 7, wherein said second transmit diversity parameter is the transmit diversity parameter value calculated based on said first plurality of quality indication signals.

12. The apparatus of claim 7, wherein said transmitter is further to transmit during a third transmission period subsequent to said second transmission period, a transmit diversity signal using a third transmit diversity parameter value, and wherein said third transmit diversity parameter is the transmit diversity parameter value calculated based on said first plurality of quality indication signals.

13. A system for modifying a transmit diversity signal comprising:
a transmitting communication device including a transmitter to transmit during a first transmission period a transmit diversity signal using a first transmit diversity parameter value, a receiver to receive during a first data collection period a first plurality of quality indication signals pertaining to system performance using said first transmit diversity parameter value, wherein said first data collection period begins after the start of the first transmission period and a processor to calculate a subsequent transmit diversity parameter value based on said first plurality of quality indication signals, wherein said first transmission period comprises at least a full slot period; and
a feedback communication device including a receiver to receive said transmit diversity signal using said first transmit diversity parameter value and a transmitter to transmit said first plurality of quality indication signals pertaining to system performance using said first transmit diversity parameter value,
wherein the transmitter of said transmitting communication device is further to transmit during a second transmission period immediately subsequent to said first transmission period, a transmit diversity signal using a second transmit diversity parameter value, and wherein during a second data collection period the receiver of said transmitting communication device is to receive a second plurality of quality indication signals pertaining to system performance using said second transmit diversity parameter value, wherein said second data collection period begins after the start of the second transmission period.

14. The system of claim 13, wherein said first data collection period ends substantially contemporaneously with the end of said first transmission period.

15. The system of claim 13, wherein said first data collection period ends after the end of said first transmission period.

16. The system of claim 13, wherein said first data collection period ends after the end of said first transmission period, and wherein said second data collection period begins substantially immediately after the end of said first data collection period.

17. The system of claim 13, wherein said second transmit diversity parameter is the transmit diversity parameter value calculated based on said first plurality of quality indication signals.

18. The system of claim 13, wherein the transmitter of said transmitting communication device is further to transmit during a third transmission period subsequent to said second transmission period, a transmit diversity signal using a third transmit diversity parameter value, and wherein said third transmit diversity parameter is the transmit diversity parameter value calculated based on said first plurality of quality indication signals.

* * * * *